(12) United States Patent
Das

(10) Patent No.: US 8,495,748 B2
(45) Date of Patent: Jul. 23, 2013

(54) MECHANISM FOR GENERATING VULNERABILITY REPORTS BASED ON APPLICATION BINARY INTERFACE/APPLICATION PROGRAMMING INTERFACE USAGE

(75) Inventor: Kushal Das, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 162 days.

(21) Appl. No.: 13/034,559

(22) Filed: Feb. 24, 2011

(65) Prior Publication Data

US 2012/0222122 A1    Aug. 30, 2012

(51) Int. Cl.
*G06F 21/00* (2006.01)

(52) U.S. Cl.
USPC ....... 726/25; 726/1; 726/22; 726/26; 713/194

(58) Field of Classification Search
USPC ............................... 726/22, 25; 713/200, 166
See application file for complete search history.

(56) References Cited

U.S. PATENT DOCUMENTS

| 8,281,401 | B2 * | 10/2012 | Pennington et al. | 726/25 |
| 2005/0010804 | A1 * | 1/2005 | Bruening et al. | 713/200 |
| 2010/0205669 | A1 * | 8/2010 | Mantripragada et al. | 726/22 |
| 2011/0191854 | A1 * | 8/2011 | Giakouminakis et al. | 726/25 |

OTHER PUBLICATIONS

"FormatGuard: Automatic Protection From printf Format String Vulnerabilities" by Crispin Cowan, Matt Barringer, Steve Beattie, and Greg Kroah-Hartman; proceedings of the 10th USENIX security symposium, Aug. 2001.*

"BitBlaze: A New Approach to Computer Security via Binary Analysis"; Song et al; R. Sekar and A.K. Pujari (Eds.): ICISS 2008, LNCS 5352, pp. 1-25, 2008. Copy right Springer-Verlag Berlin Heidelberg 2008.*

* cited by examiner

*Primary Examiner* — Taghi Arani
*Assistant Examiner* — Jason Lee
(74) *Attorney, Agent, or Firm* — Lowenstein Sandler LLP

(57) ABSTRACT

A method for generating vulnerability reports based on application binary interface/application programming interface usage may include extracting a binary file and a security report relating to a software program, the security report having a vulnerability list of pending vulnerabilities relating to the software program, and detecting, from the binary file, interface usage details associated with interfaces and shared libraries used by the software program. The interfaces include application binary interfaces (ABIs). The method may further include matching the interface usage details with the pending vulnerability of the vulnerability list, and generating a vulnerability report based on matching.

20 Claims, 4 Drawing Sheets

US 8,495,748 B2

MECHANISM FOR GENERATING VULNERABILITY REPORTS BASED ON APPLICATION BINARY INTERFACE/APPLICATION PROGRAMMING INTERFACE USAGE

TECHNICAL FILED

The embodiments of the invention relate generally to software compatibility and, more specifically, relate to providing a mechanism for generating vulnerability reports based on application binary interface/application programming interface usage.

BACKGROUND

Multiple software programs that run on a computing device often share libraries provided by the based operating system employed at the computing device. For example, these libraries can be used by the software programs to access various library or operating system functions (e.g., reading files, writing files, file management, network communications, inter-process communications, memory management, string manipulations, user interface manipulations, mathematics functions, etc.). Typically, these libraries change when the operating system changes or is updated; for example, upgrading to a newer version of an operating system can change the functions presented in one or more shared libraries, change versions and arguments used in these functions, and/or change functionalities of some, none or all of the library functions. As a result, a software program developed for one operating system may not work on another operating system and, similarly, upgrading to the new operating system may cause a software program not to work on the new or updated operating system. To determine whether a software program is executable on a new or updated operating system, the software program is typically re-compiled to run on the new or updated operating system.

The aforementioned re-compiling and re-running of the software program is further complicated as software security or vulnerability issues are raised when multiple software programs are involved and further, they include customer-generated software programs (e.g., third-party software programs that are created and provided by sources independent of the one providing the operating system and shared libraries). One way to highlight these vulnerabilities or security issues is to provide a security report to customers so that they may investigate and correct the vulnerabilities. These tasks, however, require a customer to employ an entire team of software developers to tediously investigate each aspect of these security issues, including software components associated with the vulnerabilities. Nevertheless, these teams often fall short of completing their tasks within the allocated time period, such as due to the limited and generic nature of the security reports, the tedious and manual nature of the process, and unavoidable human errors.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
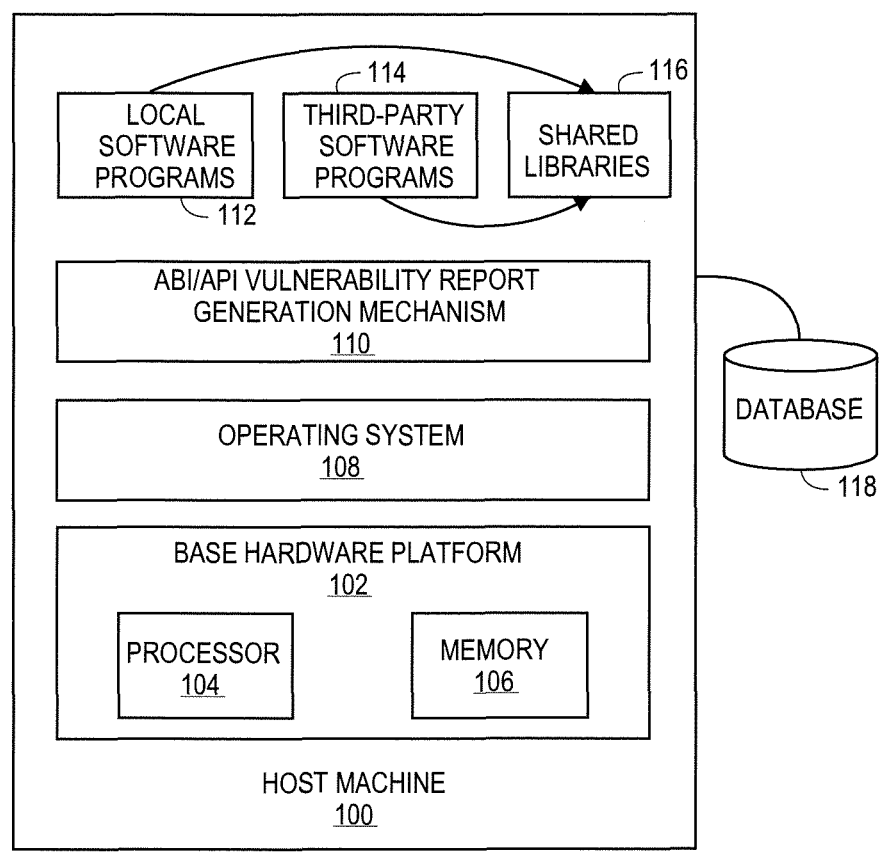
FIG. 1 illustrates a host machine employing an application binary interface/application programming interface vulnerability report generation mechanism according to one embodiment of the invention.

Embodiments of the invention provide a mechanism for generating vulnerability reports based on application binary interface/application programming interface usage is described. A method of embodiments of the invention includes extracting a binary file and a security report relating to a software program, the security report having a vulnerability list of pending vulnerabilities relating to the software program, and detecting, from the binary file, interface usage details associated with interfaces and shared libraries used by the software program. The interfaces include application binary interfaces (ABIs). The method further includes matching the interface usage details with the pending vulnerability of the vulnerability list, and generating a vulnerability report based on matching.

The embodiments of the present invention are provided for generating vulnerability reports based on application binary interface (ABI)/application programming interface (API) usage. In one embodiment, reliable and complete vulnerability reports are generated using ABI/API usage details and relevant security reports (e.g., Open Vulnerability and Assessment Language (OVAL) reports). In one embodiment, a vulnerability report is automatically generated for a software program based on the software program's usage of ABIs/APIs associated with various shared libraries. Being based on ABI/API usage makes the vulnerability report intelligent, reliable and complete. Further, in one embodiment, additional reliability, details, and specificity are obtained from having the vulnerability report use vulnerability information that can be obtained from a relevant security report. Having this level of specificity and relevant details, as well as automation, eliminates the need to employ an entire team of software developers to handle vulnerability issues. In one embodiment, vulnerability reports can be automatically generated in runtime (e.g., on the fly) on any computing device, which allows these vulnerability reports to be completed accurately and in runtime as they are not subject to manual tasks and the conventional time restraints.

In one embodiment, using ABI/API usage details allows a provider to know, understand and appreciate the needs and requirements of a third-party customer as is reflected in the ABI/API usage details relating to, for example, a third-party software program's use of ABIs/APIs corresponding to various shared libraries. Using these ABI/API usage-based vulnerability reports, providers can resolve any number of vulnerability issues on their end, which prevents potential customers from encountering errors and correcting the vulnerabilities on their end. However, in one embodiment, a vulnerability report may be provided to a customer to make the customer aware of the pending and/or corrected vulnerabilities and allow the fixing of certain pending vulnerabilities if they are particular to the customer and/or in response to a request from the customer. The vulnerability reports may be provided in any number of formats, such as Portable Document Format (PDF), Open Document Format (ODF), plain text, graph, etc.

A vulnerability or vulnerability issue refers to a flaw in a software program with the potential of corrupting other parts of the software program. For example, a vulnerability in a banking software's library tool (e.g., libltdl) can lead to exploitation by an attacker who, for example, can trick a local bank customer into running a software application (e.g., a JAVA application that uses a function to load native libraries, such as System.loadLibrary) from within an attacker-controlled directory containing a malicious library or module to execute an arbitrary code using the bank customer's privileges. It is contemplated that, in certain cases, an attacker may not be needed and that the vulnerability (and its dependencies) could automatically lead to problems, such as when a bank customer legitimately wishes to access her account information, she may (due to a vulnerability) end up accessing another bank customer's account information.

ABI/API usage details provide ABI/API usage information about various ABIs and/or APIs being accessed and used by a software entity, such as a third-party software program belong to a third-party customer. OVAL refers to a global security standard that promotes open security content, standardizes the transfer of security information across various security tools and services, and serves as a standard language to encode system details and maintain content repositories. It is contemplated that embodiments of the prevent invention are not limited to OVAL and that other security standards or reports may also be used to generate vulnerability reports.

As will be discussed throughout this document, a provider refers to a company or organization responsible for creating and providing a base operating system, local software programs, shared libraries, etc., while a customer refers to a third-party company or organization responsible for generating and providing third-party software programs that access and use the provider-based shared libraries and the associated interfaces (e.g., ABIs, APIs). Further, these shared libraries and the associated ABIs/APIs may be accessed and used by one or more local software programs that are part of the operating system and independent of the one or more third-party software programs. Embodiments of the invention are applicable to ABIs and/or APIs and as such the term "ABI(s)/API(s)", used throughout this document, refers to ABI(s) and/or API(s).

An ABI represents a low-level interface between a software program and an operating system or another software program. An ABI represents a compiled binary form of an operating system function (function) serving as a low-level interface between local and third-party software programs and the base operating system. When a function is broken, such as a print function (e.g., when a print command executes double prints or does not print the entire text (e.g., prints "hell" when asked to print "hello")), etc., the broken function indicates a possible problem with the corresponding ABI and the associated shared library. An API serves as an interface between various software programs and facilitates interaction between them, while representing a particular set of rules and specifications that a software program can follow to access and make use of the services and resources provided by another particular software program that implements that API. ABI/API refer to and may include data-identifying ABIs and/or APIs, such as those providing and covering details, such as data types, sizes, alignments, identification names and other unique identifications, symbol versions, system call numbers, binary format of object files, locations, versions, calling conversations, etc.

FIG. 1 illustrates a host machine 100 employing an ABI/API vulnerability report generation mechanism 120 according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user. In some embodiments, base hardware platform 102 may include a processor 104, memory devices 106, network devices, drivers, and so on. Host machine 100 may include a server computing system or a client computing system. Further, terms like "machine", "device", "computer", and "computing system" are used interchangeably and synonymously throughout this document.

In one embodiment, the host machine 100 employs the ABI/API vulnerability report generation mechanism 110 ("ABI/API vulnerability mechanism") to facilitate generation of vulnerability reports for any given software entity, such as a third-party software program 114, based on the software entity's ABI/API usage and a security report (e.g., an OVAL report). Further, the ABI/API vulnerability mechanism 110 can function to generate vulnerability reports in runtime (e.g., on the fly) on any given computing device, such as on the host machine 100 or any other computing machine in communication with the host machine 100.

In one embodiment, the ABI/API vulnerability mechanism 110 extracts a binary file relating to a third-party software program 114 and a security report (e.g., OVAL security report) associated with it. ABI/API vulnerability mechanism 110 then detects and obtains ABI/API usage details (also referred to as "ABI/API requirements") from the extracted binary file. The ABI/API usage details refer to the software program's relevance to and requirements with regard to certain shared libraries 116 based on its use of ABIs/APIs associated with those shared libraries 116. Since a third-party software program 114 is associated with a customer, the ABI/API usage details relating to the software program 114 can help a provider review and understand the needs and requirements of the customer with regard to the use of shared libraries 116 and its ABIs/APIs. Further, the ABI/API vulnerability mechanism 110 parses contents of the extracted security report to detect and obtain vulnerability information including a vulnerability list of any existing or pending vulnerabilities relating to the software program 114. For example, the vulnerability list may contain a list of shared libraries 116 and their ABIs/APIs and other dependencies, etc., having vulnerabilities issues. In one embodiment, the binary file (e.g., having the ABI/API usage details) and the security report (e.g., having the vulnerability information) are extracted from a database 118. The database 118 may be part of or connected to the host machine 100 or part of or connected to a remote machine (not shown) in communication with the host machine 100.

In one embodiment, the combination or matching of the security report-based vulnerability list with the ABI/API usage details obtained from the binary file provides for and generates an intelligent and more relevant vulnerability report that not only includes a list of vulnerabilities, but also provides the relevant usage details (reflecting importance) of each ABI/API to the software program 114. Knowing the usage details (and thus, importance) of each ABI/API, allows a provider to address and correct any number of vulnerabilities on the provider-end. A vulnerability report may still be provided to a customer for mere reference or to fix certain vulnerabilities; however, even on the customer end, knowing the ABI/API usage details can help the customer fix any vulnerabilities with great efficiency and without requiring a team of software developers to investigate and detect ABI/API usage details since that information is already provided in the vulnerability report.

In one embodiment, ABI/API usage details include usage detail of each ABI/API and its associated shared library 116 as it relates to and used by a third-party software program 114. For example, depending on the importance of a particular library or operating system function (e.g., printing files, deleting files, reading files, writing files, file management, network communications, inter-process communications, memory management, string manipulations, user interface manipulations, mathematics functions, etc.) to the third-party software program 114, an ABI/API associated with that operating function is expected to be more frequently accessed than other ABIs/APIs used by that third-party software program 114. Typically, a high-usage ABI/API may be regarded as more important than other less-frequently used ABIs/APIs. However, for example, certain large and often-used libraries (e.g., glibc) may be regarded as important, but their ABI/API usage details may reveal that a relatively small and rarely-used library (e.g., lib.b.2, libfreedom, etc.) may be more important to a particular customer based on its third-party software program's use of that small library.

ABI/API usage may be gathered and provided in a binary file by monitoring or scanning the software code of the third-party software program 114 for which the vulnerability report is being generated. For example, an in-between check may be performed to determine whether there is any breakage in the ABI/API. Further, shared libraries 116 and the related interfaces (e.g., ABI, API) may be accessed and used by one or more third-party software programs 114 as well as by one or more local software programs (e.g., including, but not limited to, local software programs 112) that are part of (and/or provided by the same host or provider that provided) the operating system 108 and independent of the one or more third-party software programs 114.

A shared library 116 represents a collection of classes and subroutines that are used to develop and support software programs, such as representing code and data that provide services to both local and other independent software programs 112, 114. For example, an operating system 108 may provide shared libraries 116 to implement aforementioned functions that are used by various local and third-party software programs 112, 114. Other libraries may be provided by and specific to third-party software programs 114 created and provided by third-party providers (e.g., a third-party software development company or organization other than the provider responsible for creating and providing the operating system 108 and the shared libraries 116). Each shared library 116 provides a collection or group of ABIs/APIs.

As aforementioned, a third-party or customer software program 114 represents a software program that is, at least partly, developed by an organization other than the provider that produces the operating system 108 and the shared libraries 116. For example, a third-party software program 114 may include a special-purpose software program that is used for or by an organization (e.g., media development software for media companies, specialized modeling software, etc.) and, like a local software program 112, accesses and uses any number of shared libraries 116 to utilize various functions.

Figure 2:
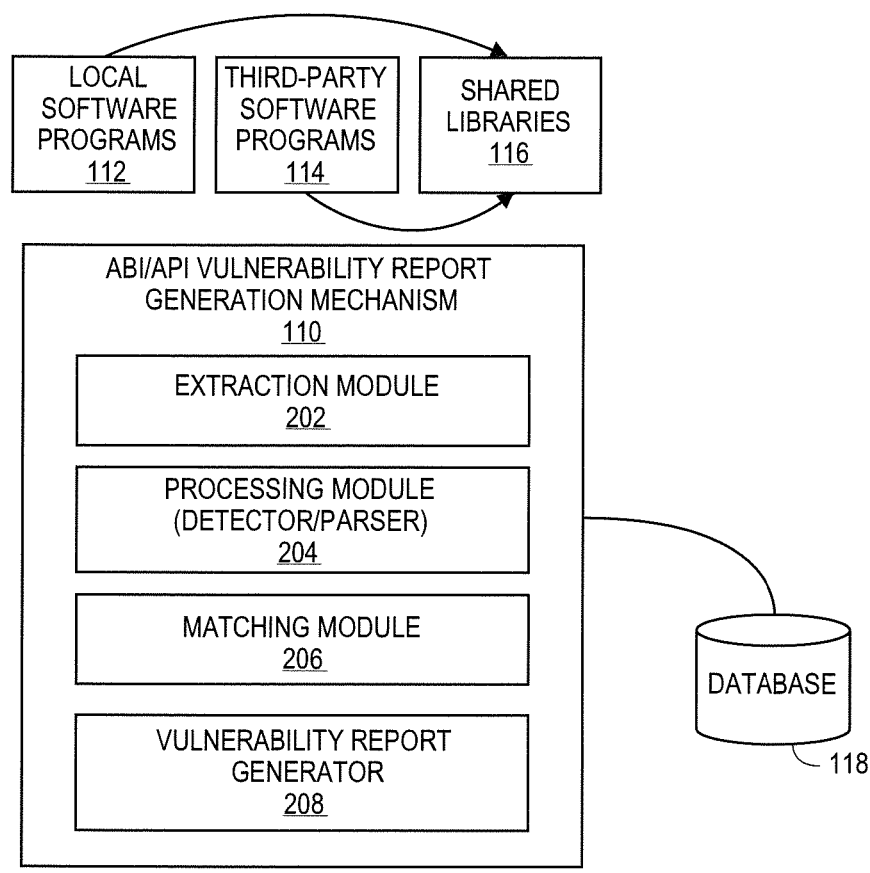
FIG. 2 illustrates an application binary interface/application programming interface vulnerability report generation mechanism according to one embodiment of the invention.

FIG. 2 illustrates an ABI/API vulnerability report generation mechanism 120 according to one embodiment of the invention. In one embodiment, the ABI/API vulnerability mechanism 110 includes an extraction module 202 to extract a binary file and a security report (e.g., OVAL security report) relating to a third-party software program 114. In one embodiment, the binary file and the security report are extracted from a database 118. The database 118 may be part of or connected to a host machine where the ABI/API vulnerability mechanism 110 resides or part of or connected to a remote machine that in communication with the host machine. ABI/API vulnerability mechanism 110 further includes a processing module 204 to detect and obtain the relevant ABI/API usage details from the binary file, and parse contents of the security report to obtain vulnerability information (e.g., vulnerability list) relating to the software program 114. Using a matching module 206, the ABI/API vulnerability mechanism 110 matches the ABI/API usage details obtained from the binary file with the vulnerability information obtained from the security report. A vulnerability report generator 208 then generates a vulnerability report based on matching results obtained from the aforementioned matching process. The vulnerability report may then be provided to the user in any format (e.g., PDF, ODF, text, graph, etc.) and displayed using a display device.

In one embodiment, the matching process includes associating usage details to each ABI/API or shared library 116 listed in the vulnerability list as having a vulnerability issue. For example, a binary file and a security report relating to a third party software program 114 (e.g., hero) are extracted. The security report may list lib-a as having two vulnerabilities, lib-b as having one vulnerability, and lib-c as having zero vulnerabilities. The matching module 206 then matches the detected ABI/API usage details to lib-a, lib-b, and lib-c. Now suppose, the ABI/API usage details reveal that lib-a is no longer being used by hero, but lib-b and lib-c are still frequently used and therefore, lib-b and lib-c are regarded as more important (than lib-a). Using the ABI/API usage details, a provider- or customer-based user (e.g., software developer) may choose to fix the single vulnerability of lib-b, maintain lib-c, and simply ignore the two vulnerabilities of lib-a. Further, if lib-a is not anticipated to be used in the future, it might be removed all together. Without having the benefit of these ABI/API usage details and/or by solely relying on the security report's vulnerability list, the software developer would have either fixed lib-a first (because of lib-a's two vulnerabilities) or spent a great deal of time and labor, probably along with a number of software developers, in an effort to discover that lib-a (despite its two vulnerabilities) is not as important to hero as lib-b and lib-c.

Figure 3:
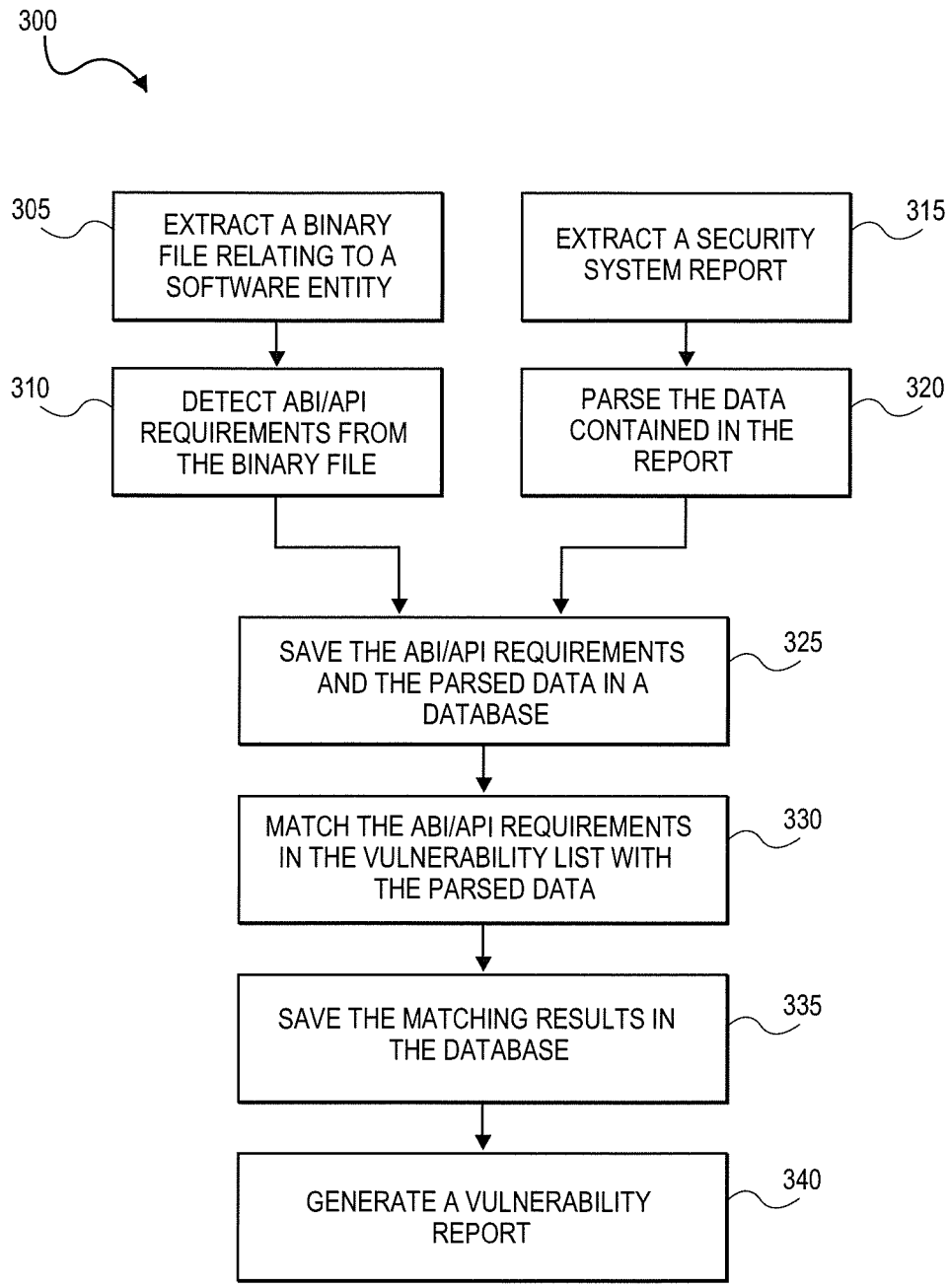
FIG. 3 illustrates a method for generating vulnerability reports based on application binary interface/application programming interface usage according to one embodiment of the invention.

FIG. 3 illustrates a method for generating vulnerability reports based on ABI/API usage according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by the ABI/API vulnerability report generation mechanism of FIG. 1.

Method 300 starts at block 305 with extracting a binary file relating to a software entity (e.g., a third-party software program) for which a vulnerability report is to be generated. At block 310, ABI/API usage details are detected and obtained from the extracted binary file. As aforementioned, ABI/API usage details provide the use and importance of each ABI/API as it relates to each shared library of the software entity. At block 315, a security report (e.g., OVAL security report) relating to the software entity is extracted. Vulnerability information, such as a vulnerability list, relating to the software entity is obtained by parsing content of the security report at block 320. In one embodiment, the binary file (e.g., having the ABI/API usage details) and the security report (e.g., having the vulnerability information) are extracted from a database. The database may be part of or connected to the host machine or part of or connected to a remote machine in communication with the host machine.

At block 325, the ABI/API usage details and the vulnerability information are stored at a database. In one embodiment, the binary file and the security report may also be stored and subsequently extracted from the same or another database. At block 330, in the ABI/API usage details are matched with the items listed in the vulnerability list. The matching results are stored at the database at block 335. At block 340, the matching results are used to generate a vulnerability report that is based on ABI/API usage.

Figure 4:
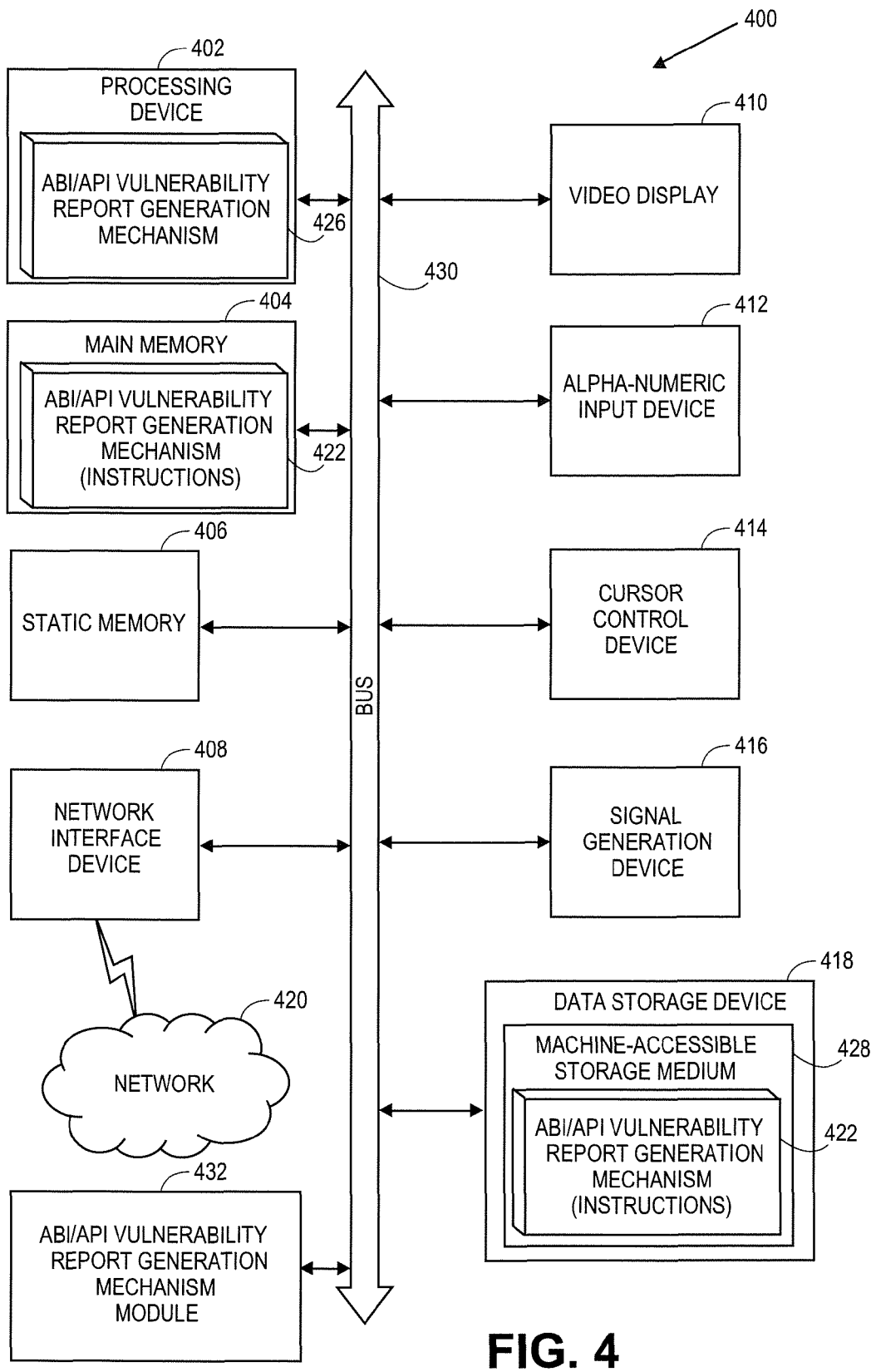
FIG. 4 illustrates a computing system according to one embodiment of the invention.

FIG. 4 illustrates a computing system 400 employing an ABI/API vulnerability report generation mechanism according to one embodiment of the invention. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, RAM, dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computing system 400 may further include a network interface device 408. The computing system 400 also may include a video display unit 410 (e.g., a liquid crystal display (LCD) or a cathode ray tube (CRT)) connected to the computing system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., ABI/API vulnerability report generation mechanism) embodying any one or more of the methodologies or functions described herein. The ABI/API vulnerability report generation mechanism may also reside, completely or at least partially, within the main memory 404 (e.g., ABI/API vulnerability report generation mechanism (instructions) 422) and/or within the processing device 402 (e.g., ABI/API vulnerability report generation mechanism (processing logic) 426) during execution thereof by the computing system 400, the main memory 404 and the processing device 402 also constituting machine-readable storage media. Further, for example, ABI/API vulnerability report generation mechanism instructions 422 may be transmitted or received over a network 420 via the network interface device 408.

The machine-readable storage medium 428 may also be used to store the ABI/API vulnerability report generation mechanism (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

ABI/API vulnerability report generation mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "extracting", "detecting", "probing", "parsing", "comparing", "analyzing", "saving", "storing", "scanning", "monitoring", "obtaining", "accessing", "providing", "facilitating", "generating", "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
    extracting, by a processing device, a binary file and a security report relating to a software program executed by the processing device, the security report having a vulnerability list of pending vulnerabilities relating to the software program;
    detecting, from the binary file, interface usage details associated with interfaces used by the software program and associated with shared libraries used by the software program, wherein the interfaces comprise application binary interfaces (ABIs), wherein the interfaces correspond to operating system functions associated with the shared libraries;
    matching the interface usage details with the pending vulnerabilities of the vulnerability list; and
    generating a vulnerability report based on the matching, wherein the vulnerability report comprises a list of the pending vulnerabilities based on their associated interface usage.

2. The computer-implemented method of claim 1, wherein the interfaces further comprise application programming interfaces (APIs).

3. The computer-implemented method of claim 1, wherein matching comprises associating each interface's interface usage details with its corresponding pending vulnerabilities.

4. The computer-implemented method of claim 3, wherein the interface usage details of the interface are based, at least in part, on a frequency at which the interface is used by the software program.

5. The computer-implemented method of claim 1, wherein the operating system functions relate to one or more of file accesses, networking capabilities, user interface functions, thread management, process management, or common utilities.

6. The computer-implemented method of claim 1, further comprising correcting, at a provider, one or more of the pending vulnerabilities based on their associated interface usage.

7. The computer-implemented method of claim 1, further comprising displaying, via a display device, the vulnerability report using at least one of Portable Document Format (PDF), Open Document Format (ODF), text format, or graphic format.

8. A system comprising:
    a memory to store instructions for generating vulnerability reports; and
    a processing device communicably coupled to the memory to execute the instructions, wherein the instructions cause the processing device to:
        extract a binary file and a security report relating to a software program executed by the processing device, the security report having a vulnerability list of pending vulnerabilities relating to the software program;
        detect, from the binary file, interface usage details associated with interfaces used by the software program and associated with shared libraries used by the software program, wherein the interfaces comprise application binary interfaces (ABIs), wherein the interfaces correspond to operating system functions associated with the shared libraries;
        match the interface usage details with the pending vulnerabilities of the vulnerability list; and generate a vulnerability report based on the matching, wherein the vulnerability report comprises a list of the pending vulnerabilities based on their associated interface usage.

9. The system of claim 8, wherein the interfaces further comprise application programming interfaces (APIs).

10. The system of claim 8, wherein matching comprises associating each interface's interface usage details with its corresponding pending vulnerabilities.

11. The system of claim 10, wherein the interface usage details of the interface are based, at least in part, on a frequency at which the interface is used by the software program.

12. The system of claim 8, wherein the operating system functions relate to one or more of file accesses, networking capabilities, user interface functions, thread management, process management, or common utilities.

13. A non-transitory machine-readable medium including instructions that, when executed by a processing device, cause the processing device to perform operations comprising:
- extracting, by the processing device, a binary file and a security report relating to a software program executed by the processing device, the security report having a vulnerability list of pending vulnerabilities relating to the software program;
- detecting, from the binary file, interface usage details associated with interfaces used by the software program and associated with shared libraries used by the software program, wherein the interfaces comprise application binary interfaces (ABIs), wherein the interfaces correspond to operating system functions associated with the shared libraries;
- matching the interface usage details with the pending vulnerabilities of the vulnerability list; and
- generating a vulnerability report based on the matching, wherein the vulnerability report comprises a list of the pending vulnerabilities based on their associated interface usage.

14. The non-transitory machine-readable medium of claim 13, wherein the interfaces further comprise application programming interfaces (APIs).

15. The non-transitory machine-readable medium of claim 13, wherein matching comprises associating each interface's interface usage details with its corresponding pending vulnerabilities.

16. The non-transitory machine-readable medium of claim 15, wherein the interface usage details of the interface are based, at least in part, on a frequency at which the interface is used by the software program.

17. The non-transitory machine-readable medium of claim 13, wherein the operating system functions relate to one or more of file accesses, networking capabilities, user interface functions, thread management, process management, or common utilities.

18. The system of claim 8, wherein the processing device further to correct, at a provider, one or more of the pending vulnerabilities based on their associated interface usage.

19. The system of claim 8, wherein the processing device further to display, via a display device, the vulnerability report using at least one of Portable Document Format (PDF), Open Document Format (ODF), text format, or graphic format.

20. The non-transitory machine-readable medium of claim 13, wherein the operations further comprise correcting, at a provider, one or more of the pending vulnerabilities based on their associated interface usage.

* * * * *